(12) United States Patent
Yuasa et al.

(10) Patent No.: US 8,209,201 B1
(45) Date of Patent: Jun. 26, 2012

(54) SYSTEM AND METHOD FOR CORRELATING OBJECTS

(75) Inventors: Kel Yuasa, Mountain View, CA (US);
Bernard Burg, Menlo Park, CA (US);
Kannan Govindarajan, Sunnyvale, CA (US); Harumi Anne Kuno, Cupertino, CA (US); Kevin Lee Smathers, Hayward, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1965 days.

(21) Appl. No.: 11/297,520

(22) Filed: Dec. 8, 2005

(51) Int. Cl.
*G06Q 10/00* (2012.01)
(52) U.S. Cl. ............... 705/7.11; 705/7.27; 705/301
(58) Field of Classification Search ........... 705/7.11, 705/7.27, 301
See application file for complete search history.

(56) References Cited

U.S. PATENT DOCUMENTS

| | | | |
|---|---|---|---|
| 6,184,888 B1 | 2/2001 | Yuasa | |
| 6,396,503 B1 | 5/2002 | Goss | |
| 6,522,336 B1 | 2/2003 | Yuasa | |
| 6,601,234 B1 * | 7/2003 | Bowman-Amuah | 717/108 |
| 6,782,238 B2 | 8/2004 | Burg | |
| 6,789,054 B1 * | 9/2004 | Makhlouf | 703/6 |
| 6,957,186 B1 * | 10/2005 | Guheen et al. | 705/323 |
| 7,020,697 B1 * | 3/2006 | Goodman et al. | 709/223 |
| 7,027,055 B2 * | 4/2006 | Anderson et al. | 345/473 |
| 7,072,807 B2 * | 7/2006 | Brown et al. | 703/1 |
| 7,941,438 B2 * | 5/2011 | Molina-Moreno et al. | 707/756 |
| 7,984,420 B2 * | 7/2011 | Eldridge et al. | 717/108 |
| 2004/0039726 A1 | 2/2004 | Shimizu | |
| 2004/0073574 A1 | 4/2004 | Shimizu | |
| 2004/0212827 A1 | 10/2004 | Otsuji | |
| 2007/0147685 A1 * | 6/2007 | Ericson | 382/225 |
| 2010/0223593 A1 * | 9/2010 | Eldridge et al. | 717/105 |

OTHER PUBLICATIONS

F. Baader et al., Description Logics for the Semantic Web, Kunstliche Intelligenz, 16(4):57-59, 2002.
P.A. Bonatti et al., An Ontology-Extended Relational Algebra, IEEE IRI, 2003.
P. Clark et al., Rule Induction with CN2: Some Recent Improvements, ECML '91, pp. 151-163, 1991.
A. Doan et al., Learning to Match Ontologies on the Semantic Web, VLDB Journal, 2003.
C. Ensel et al., An Approach for Managing Service Dependencies with XML and the Resource Description Framework, Journal of Network and Systems Management, 10(2):27-34, Jun. 2002.
J.B. Jorge et al., An Ontology-Based Method to Merge and Map Management Information Models, HP Openview University Association Tenth Plenary Workshop, Geneva, Switzerland, Jul. 2003.
G. Lanfranchi et al., Toward a New Landscape of System Management in an Autonomic Computing Environment, IBM Systems Journal, 42(1):119-128, 2003.
A. Maedche et al., An Infrastructure for Searching, Reusing and Evolving Distributed Ontologies, Twelfth International Conference on World Wide Web, pp. 439-448, 2003.
S. Melnik et al., A Programming Platform for Generic Model Management, in ACM SIGMOD 2003, San Diego, CA, Jun. 2003.

(Continued)

*Primary Examiner* — Mark Fleischer

(57) ABSTRACT

Embodiments of the present invention relate to a system for correlating configurations, comprising a model layer having a generic model library, a control layer having generic control logic implemented in terms of the generic model library, and a view layer having reusable views and common tools that operate upon generic interfaces and constructs defined by the generic model library, wherein the generic model library, generic control logic, and reusable views and commons tools are defined to support a general functionality.

11 Claims, 5 Drawing Sheets

OTHER PUBLICATIONS

P. Mitra et al., Graph-Oriented Model for Articulation of Ontology Interdependencies, 7th International Conference on Extending Database Technology, Springer-Verlag, 2000.

N.F. Noy et al., Anchor-Prompt: Using Non-Local Context for Semantic Matching, Seventeenth International Joint Conference on Artificial Intelligence, (IJCAI-2001), 2001.

E. Rahm et al., A Survey of Approaches to Automatic Schema Matching, VLDB Journal, 10:334-350, Nov. 2001.

L. Stojanovic et al., Ontology Evolution within Ontology Editors, Thirteenth International Conference on Knowledge Engineering and Knowledge Management, pp. 53-62, Sep. 2.

H. Stuckenschmidt et al., Integrity and Change in Modular Ontologies, International Joint Conference on Artificial Intelligence, 2003.

F. Van Harmelen, Owl: An Ontology Language for the Semantic Web, SIKS/IKAT Symposium, Universiteit Maastricht, Jun. 2003.

G. Wiederhold, An Algebra for Ontology Composition, Monterey Workshop on Formal Methods, pp. 56-61, Sep. 1994.

\* cited by examiner

SYSTEM AND METHOD FOR CORRELATING OBJECTS

BACKGROUND

Businesses sometimes choose to outsource certain operations outside of their core function. Indeed, it is now recognized that outsourcing certain areas (e.g., IT) can be cost effective and improve business operations. For example, many businesses outsource management of their information technology (IT) resources. By outsourcing its IT management, a business can benefit from a service provider's economies of scale, explicitly control IT expenses, and free assets for use in improving core business functionality rather than using the assets to run non-core IT operations.

Providers of outsourcing services typically contract to manage their customers' operations and business processes. Such contracts are typically designed to provide guidelines and details for addressing a customer's specific needs. Outsourced service deals typically depend on an exceptionally large number of details. Frequently, service providers have multiple customers, each having a different set of needs. For example, in order to address the unique IT needs of a variety of different customers, existing procedures generally require that a service provider perform unique service design processes for each individual customer. These individualized design processes are typically decentralized, complex, and expensive undertakings that require the management of a large number of components, dependencies and relationships. Accordingly, continuity is hindered, making the design process inefficient, labor-intensive, time-consuming, and prone to error. For example, a lack of continuity can result in a service provider contracting to provide services in an area that the service provider has no capacity for delivery.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions will be made to achieve the developers' specific goals, such as compliance with system-related and business-related constraints, which can vary from one implementation to another. Moreover, it should be appreciated that such a development effort can be complex and time consuming, but would remain a routine undertaking of design, fabrication, and manufacture for those of ordinary skill having the benefit of this disclosure. It should be noted that illustrated embodiments of the present invention throughout this text represent a general case.

Embodiments of the present invention relate to providing business services for outsourced operations. For example, one embodiment of the present invention includes a computer assisted information management system for business service design and implementation. Business services (hereinafter "services") are herein defined as human acts or processes that are typically performed for compensation. Outsourcing includes contracting with a service provider to provide these services (e.g., managing certain non-core business operations).

In a typical outsourcing agreement, a service provider is employed by a customer enterprise to manage technical components and business aspects of the enterprise's peripheral operations (e.g., IT operations) as a unit. For example, a service provider can be contracted by a customer to provide desktop computer management services, which include managing a lifecycle for desktop computers for all of the customer's employees all over the world. When providing such services, it is frequently unclear where the boundary lies between the service provider's environment and the customer's environment. Indeed, outsourced services are frequently provided in the customer's environment (e.g., office location) using the customer's resources (e.g., computer network). Accordingly, outsourced service providers often rely on significant customization of services to please clients. It is now recognized that generic interfaces and constructs can be defined to support general functionality. This helps to reduce issues associated with the complexities of providing fully customized solutions. For example, embodiments of the present invention can prevent a service provider from selling support where the service provider does not have delivery capacity or prevent the service provider from giving better service than what was purchased.

Figure 1:
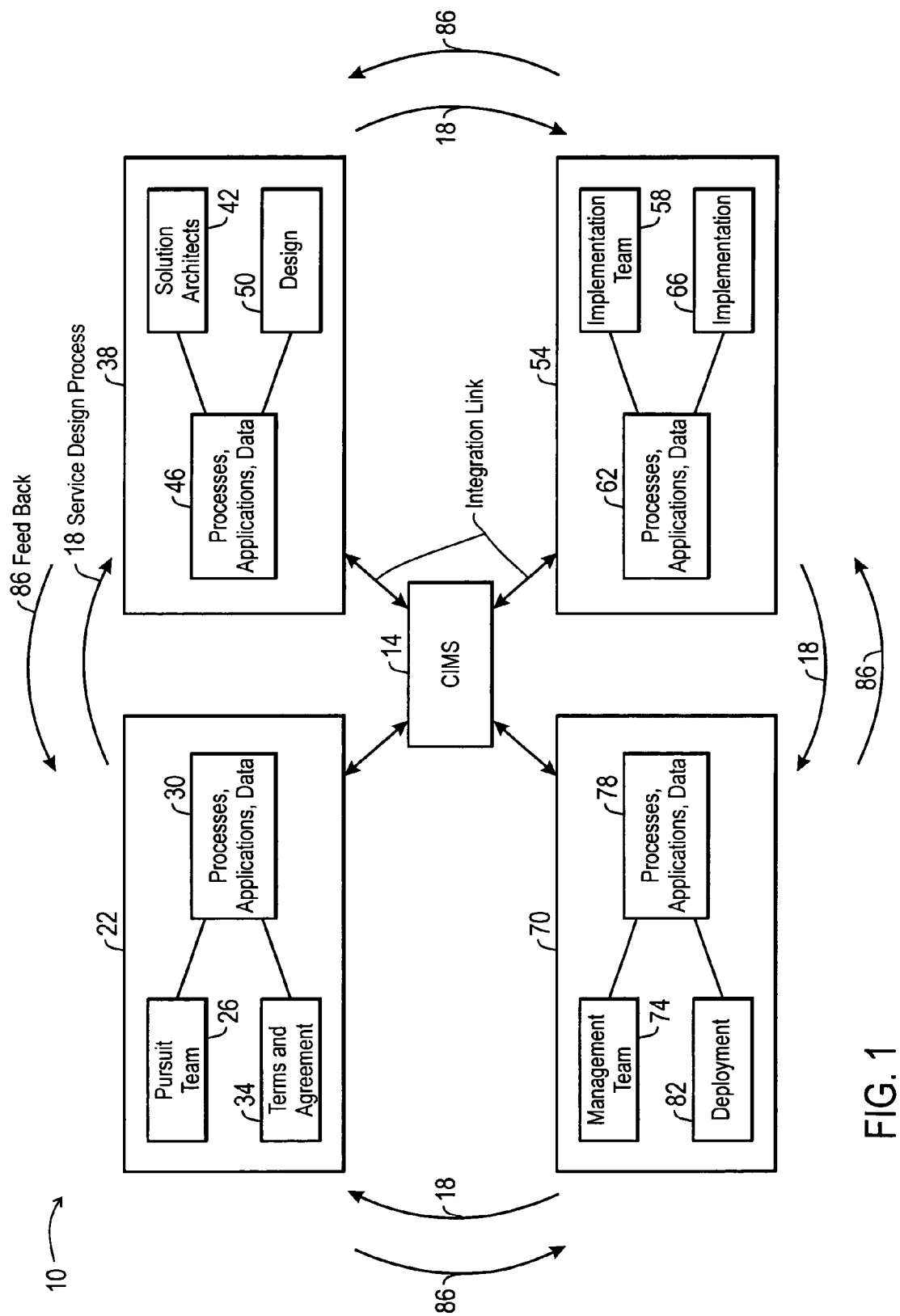
FIG. 1 is a block diagram of a computer assisted information management system illustrating one embodiment of the present invention.

FIG. 1 is a block diagram of a computer assisted information management system illustrating one embodiment of the present invention. The computer assisted information management system is generally referred to by reference number 10. Specifically, FIG. 1 illustrates incorporation of a computerized information management system (CIMS) 14 within a service design process 18. The service design process 18 includes a sequence of configurations across functional systems involving human processors. The CIMS 14 centralizes and coordinates aspects of the service design process 18 by providing a common information model. Specifically, the CIMS 14 parameterizes and links various configuration processes within the service design process 18. By integrating these various processes, the CIMS 14 can then automate computable tasks of relationship information management and configuration process management. Further, the CIMS 14 exploits human input for difficult tasks, such as term-value configuration and mapping validation. The CIMS 14 also integrates relationships discovered during human input phases into the system. Accordingly, the CIMS 14 facilitates more accurate and efficient management of correlations.

The service design process 18 represents a service life cycle and includes four basic phases. The first phase is a strategic assessment and configuration phase 22, wherein a customer and sales team, which will be referred to herein as pursuit team 26, creates and configures a service proposal. For example, the pursuit team 26 utilizes its processes, applications, and data (block 30), to configure and store terms and agreements 34 (e.g., a proposal in response to a customer's request for proposals) that will guide and define the services to be provided. The second phase is a solution design phase 38, wherein solution architects 42 utilize their processes, applications, and data (block 46) to develop concepts and designs 50. For example, in the design phase 38, the solution architects 42 configure a statement of work that fulfills the terms and agreements 34. The third phase is a setup and implementation phase 54, wherein a setup and delivery team, which will be referred to herein as implementation team 58, creates and configures a delivery plan that involves setting up and implementing configured service features. For example, the implementation team 58 uses its processes, applications, and data (block 62) to provide an implementation 66 of the designs 50. The fourth phase is an ongoing delivery phase 70 in which a service owner, ongoing delivery team, or management team 74 implements procedures using processes, applications, and data (block 78) to provide for ongoing service. For example, in the fourth phase, the management team 74 provides deployment 82, which can include an ongoing service plan adapted to meet the customer's needs. It should be noted that the various teams (e.g., 26, 42, 58, and 74) are referenced herein with titles that reflect their general functions.

The service configuration process phases (e.g., 22, 38, 54, and 70) discussed above can span multiple organizations and regions, each with their own sets of processes, tools, models, and data sources. However, in accordance with embodiments of the present invention, the phases are linked by the CIMS 14 to facilitate information sharing without reentering and reinterpreting the information at each phase. The CIMS 14 links the service configuration process phases by providing them with a shared information model. For example, in the illustrated embodiment, the CIMS 14 is communicatively linked to information relating to the processes, applications, and data (e.g., 30, 46, 62, 78) for each phase. Further, at each of the four phases, the CIMS 14 assists with making the output for a particular phase reflect the capabilities of the next phase. Indeed, embodiments of the present invention provide forward and backward coordination, thus facilitating delivery on contract terms in an efficient and cost-effective manner. Tracing customer requirements from the configuration phase 22 to the ongoing delivery phase 70 and providing feedback loops 86 facilitates understanding by all teams (e.g., 26, 42, 58, and 74) of impacts associated with proposed changes. It should be noted that each of the teams (e.g., 26, 42, 58, and 74) can include overlap. For example, certain members of the solution architects 42 can also be members of the pursuit team 26. Indeed, all of the teams can be formed by a single group. However, in some embodiments, the teams are without overlap.

Embodiments of the present invention, will improve operational efficiency and profitability of outsourced service providers by using the CIMS 14 to parameterize and link configuration processes, thus integrating the processes, tools, and data involved in business service design and delivery. In one embodiment of the present invention, the CIMS 14 is a collection of software that facilitates creating or synthesizing a design, managing the design process and underlying data, and controlling the sequencing of underlying design applications and processes. Indeed, in one embodiment of the present invention, the CIMS 14 includes a computer-aided design (CAD) system. Additionally, the CIMS 14 includes a library that models product components and their relationships. For example, the CIMS 14 can deal with tedious details of mechanical design tasks (e.g., version management), component reuse, validation of design rules, and so forth. Indeed, the CIMS 14 can track details humans utilize in making semantic decisions. Accordingly, embodiments of the present invention free assets (e.g., employees) to focus efforts on design objectives rather than peripheral issues. Similarly, the CIMS 14 can assist in creating appropriate plans for the delivery of a solution.

Figure 2:
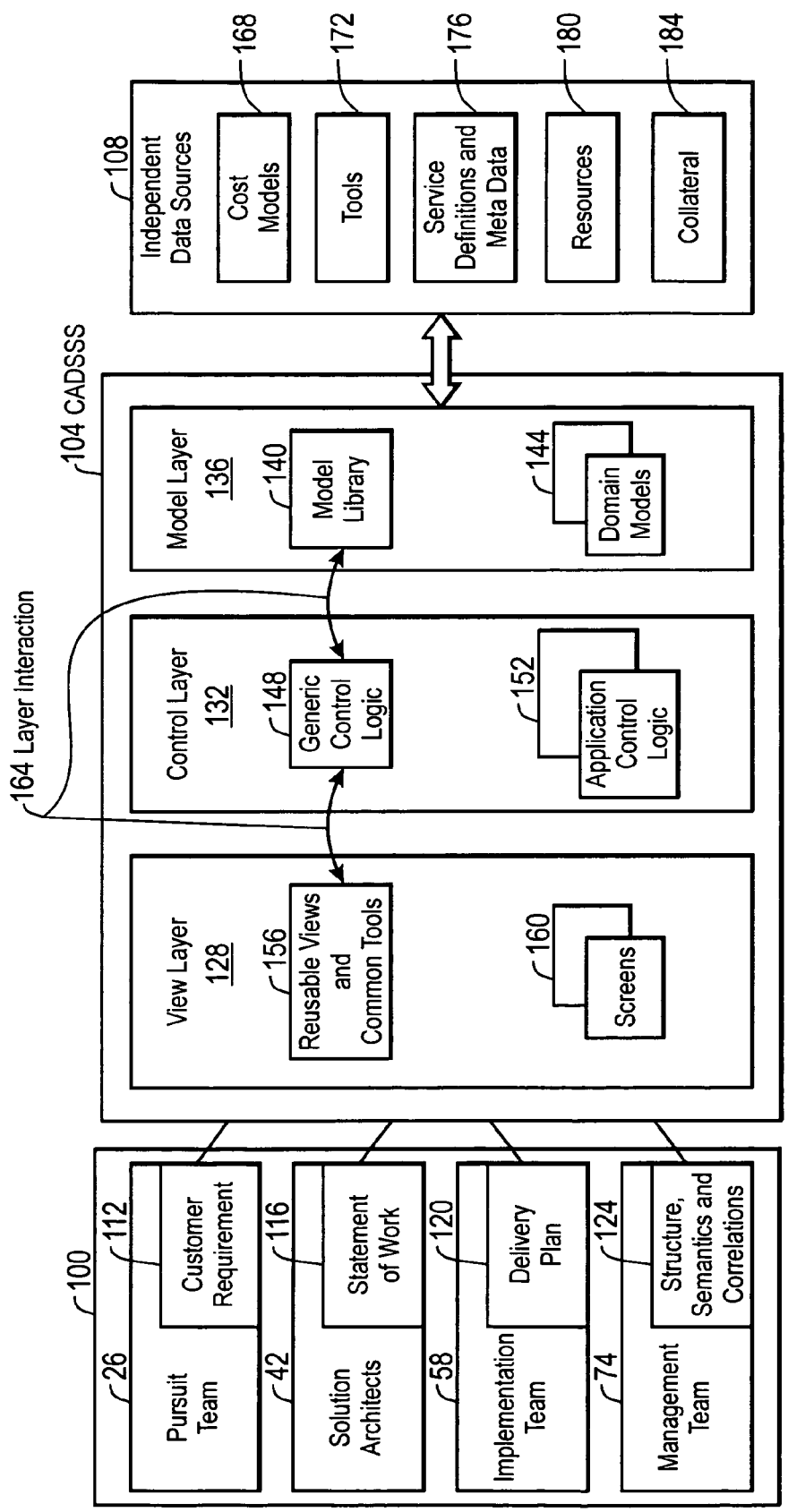
FIG. 2 is a block diagram of a design system illustrating one embodiment of the present invention.

FIG. 2 is a block diagram of a design system illustrating one embodiment of the present invention. Specifically, FIG. 2 illustrates functional teams 100, a computer-assisted design system for service solutions (CADSSS) 104, and independent data sources 108. These components cooperate in accordance with present embodiments to design and provide unique service solutions. Further, embodiments of the present invention are capable of adapting to underlying data sources that are autonomous and continually evolving. It should be noted that the CADSSS 104 is a detailed representation of components of the CIMS 14.

The CADSSS 104 tracks details needed for humans to make semantic decisions and facilitates provision of solutions. Further, the CADSSS 104 facilitates creation of appropriate plans for delivery of the solutions. The CADSSS 104 includes a three layer model-view-controller design. The three layers are an application view layer 128, a control layer 132, and a model layer 136. Each of the three layers is implemented in two parts. The first part being a generic front-end that relies on a general conceptual model and the second part being a domain-specific back-end that captures source-specific representations. The layers interact in terms of the generic interfaces and constructs, which facilitates incorporation of new component types into the system and insulates the system from changes to underlying sources.

The model layer 136 includes a core model library 140 of constructs and interfaces as a front-end and domain models 144 as a back-end. The model layer 136 distinguishes between source-specific representations (e.g., a configurable service feature as represented by a given data source) and general conceptual abstractions (e.g., a configurable template object).

For example, the core model library 140 includes the specification for a generic interface for objects that can be correlated between domains. For the purposes of this example, this interface is named Correlated Object. The Correlated Object interface prescribes some general properties, including properties needed for building user interfaces (e.g., display name, popup name, full name), as well as some generic operations (e.g., the ability to save changes). When a new domain model 144 is added into the system, source-specific representations of the new configurable components are added to the CIMS system. Since these configurable components are intended to be correlated to configurable components from other domains, the source-specific representations should implement the Correlated Object interface. For example, if the new domain model represented a service to support a customer's desktop computers, then the source-specific representation of the service should implement the Correlated Object interface, and define values for the display name, popup name, full name properties. For example, "MDS" can be the display name, "Managed Desktop Service" can be the popup name, and so forth. Similarly, a source representation of user requirements can use the title or first line of the requirement as the display name, some truncated version of the display name as the popup name, and the full text of the requirement as the full name.

The control layer 132 includes reusable control logic 148 as its front-end and application control logic 152 as its back-end. The control layer 132 is supported by the reusable control logic 148, which is implemented in terms of the core model library 140 of the model layer 136. For example, the core model library 140 can include a set of interfaces and constructs designed to represent the parameters and ranges that belong to configurable components. The control layer 132 can then include a generic control logic component that can validate parameter values for arbitrary instances of classes that implement the configurable components interfaces (i.e., configured components).

Figure 4:
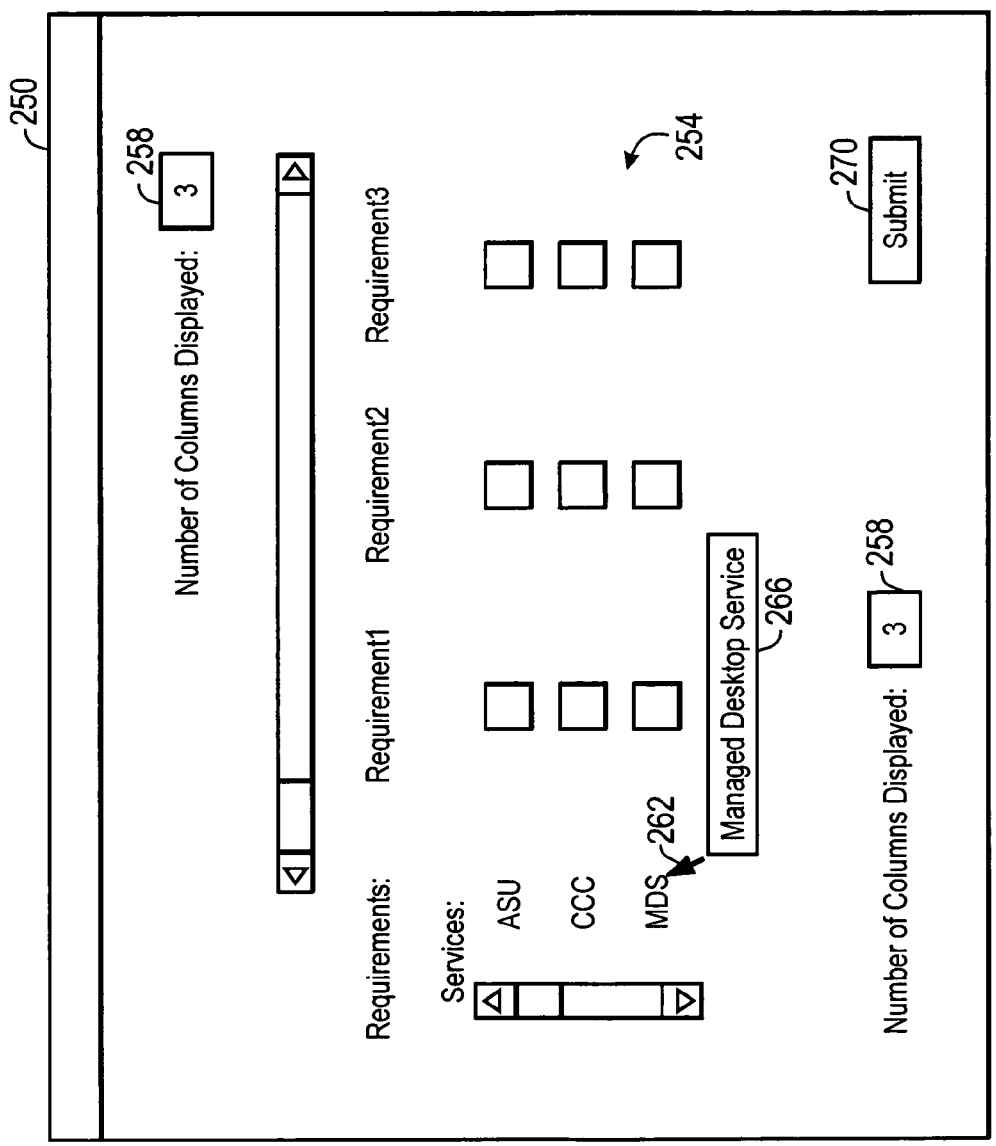
FIG. 4 is a representation of a matrix tool illustrating one embodiment of the present invention.

The view layer 128 includes reusable views and common tools 156 as its front-end and screens 160 as its back-end. The reusable views and common tools 156 operate upon generic interfaces and constructs defined by the core model library 140 in the model layer 136. For example, the view layer can include a tool for creating matrix-like user-interfaces for users to indicate relationships between Correlated Object interface. Any classes that implement the Correlated Object interface could be plugged into such a tool without any change to existing code. For example, such a matrix tool can be used to create a view such as shown in FIG. 4 to correlate configured instances of services to requirements. As shown in FIG. 4, a configured instance of the Managed Desktop Service from our previous example is shown using its display name of "MDS," and when the mouse is moved over that text box, the popup name "Managed Desktop Service" is displayed. This interaction between each of the layers' generic interfaces (e.g., 140, 148, and 156) is represented by arrows 164.

The CADSSS 104 is an extensible system for sequential configurations that supports defining additional configuration steps. For example, one embodiment of a CADSSS system evaluates a customer's needs and generates requirements, then configures instances of various services to meet those requirements. Such an embodiment utilizes the Correlated Object interface and matrix tool, as discussed above. A step can be added to this embodiment, specifying that the configured service instances also adhere to customer-defined cost constraints. This can be achieved by creating the representation of cost constraints to leverage the set of interfaces and constructs designed to represent the parameters and ranges that belong to configurable components, as well as to implement the Correlated Object interface. Upon defining an additional step, the CADSSS 104 operates on constructs relating to the new step to infer relationships with pre-existing configuration components. In accordance with present embodiments, a set of generic interfaces and constructs are defined to support general functionality. Thus correlation of arbitrary data objects is facilitated across configurations. For example, given configured service instances that are correlated to both cost constraints and customer requirements, relationships between customer requirements and cost constraints can be inferred. A configuration consists of selection of terms from a candidate set and assignment of values for those terms. Embodiments of the present invention will manage continuity across configurations.

The CADSSS 104 defines a core set of interfaces (i.e., abstract description of structure and behavior of type of object) for representing and correlating configured terms. The model library 140 is built and tuned such that it relates to the provision of services. Indeed, embodiments of the present invention facilitate management of relationships between intangible components. In services arrangements, a process is frequently an integral part of the product. For example, managing desktop computers includes a hardware resource management process used to deliver the service. This hardware asset management process is an important component and thus is represented in an underlying library (e.g., 140). Furthermore, service design is frequently dependent upon human resources. Accordingly, the costs of delivering a business service varies based on availability of required human resources. The proper human resources are needed at the proper time and place. For example, employees that are experienced with a particular customer can be a requirement. Thus, embodiments of the present invention coordinate human resource database information and the like among the teams 100.

When adding a new component type, it is brought into the library 140 by implementing generic interfaces and constructs and by adhering to a standardized naming convention. Because reusable control logic is implemented in terms of the core library 140, the control layer 132 can manage objects of the new type without having to be updated. For example, the control layer 132 will be able to handle view events and updates to the model layer 136 that are related to the new component type. Similarly, because the view layer 128 has the common tools 156 built in terms of the core library 140, instances of the new component type can immediately plug into tools, such as those that manage relationships between components.

Embodiments of the present invention are flexible and accommodate dynamic component types. Specifications for component objects of a service are typically in a continual process of design, and thus are frequently changing. Additional components can be arbitrarily added for a given design. For example, a customer can require that a custom hardware asset management application (absent from the original system) be used in a certain location (e.g., Japan). It is desirable for synthesis tools (e.g., 156) to be capable of using these newly added components with minimal customization. Accordingly, the interface between service provider and client spans multiple phases of service, as illustrated in FIG. 2.

Embodiments of the present invention facilitate management of regional variations. Many service deals include coordinating multiple teams that represent a multitude of functional and regional entities. The pursuit team 26 typically acts in such situations to represent the interests of the regional teams involved in delivering the service. For example, when working on a managed desktop computer deal in a foreign location, the pursuit team 26 generally desires to take into account hardware asset management capabilities of local delivery teams and the impact of such capabilities on overall costs. Accordingly, embodiments of the present invention avoid hard-coding regional business logic in the CADSSS 104 to facilitate manipulation depending on which variables apply. It should also be noted that many service deals require design operations on the customer site. Accordingly, embodiments of the present invention support disconnected operation. For example, the CADSSS 104 is operable without network connectivity (e.g., when outside the service provider's firewall) at designated phases of design.

Service solutions are designed by a variety of functional teams (e.g., 100), each with their own perspective. The functional teams 100 are responsible for each stage of design. In the illustrated embodiment, the functional teams 100 include the pursuit team 26, solution architects 42, implementation team 58, and management team 74. Each of these teams has a corresponding perspective, as presented by the components illustrated by blocks 112 (customer requirement), 116 (statement of work), 120 (delivery plan), and 124 (structure, semantics, and correlations) respectively. The pursuit team 26 and solution architects 42 see a system with screens 160 for understanding customer financial metrics and they build solutions from reference configurations. The implementation team 58 sees a system that facilitates delivery plans for the configured solutions and then they implement such plans. The management team 74 manages service by using the CADSSS 104 to define and maintain service definitions and metadata. Further, the management team 74 (e.g., business managers) can use screens 160 (e.g., balanced score card screens) to access risk information on a deal-by-deal basis, as well as obtain a view relating to how up to date service information is on a service by service basis.

The CADSSS 100 transforms data into information, including critical information that flows between the teams 100 and the lifecycle phases (e.g., 22, 38, 54, and 70). This continuity facilitates accurate and appropriate transformation of information. For example, information gathered during customer evaluations and interviews is transformed into delivery planning. Further, changes in delivery planning are reflected back to the customer. In one example, the pursuit team 26 can use aspects of the CADSSS 104 to capture the needs the customer accurately and to transform those needs into structures the implementation team 58 can use to deliver the service once a contract has been signed.

Personal productivity tools (e.g., 108) are leveraged in accordance with present embodiments to encapsulate business logic using documents that can be interpreted using standard applications (e.g., Microsoft Excel). Some of the independent data sources that the CADSSS 104 integrates include cost models 168, tools 172, service definitions and metadata 176, resources 180, and collateral 184. In one embodiment, for example, the cost models 168 are drawn as a document rather than as a database because flexibility is leveraged on a document-based approach to implement cost calculations.

Figure 3:
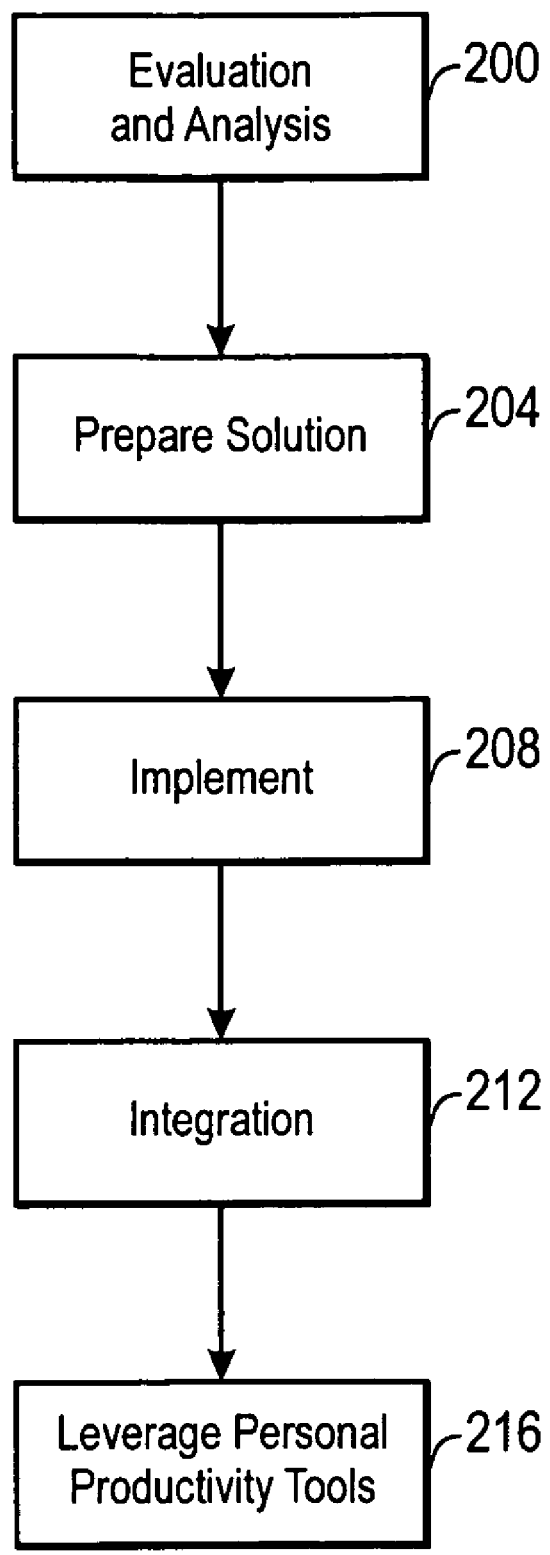
FIG. 3 is a block diagram of a method for service design illustrating one embodiment of the present invention.

FIG. 3 is a block diagram of a method for service design illustrating one embodiment of the present invention. In one embodiment, the functions illustrated in FIG. 3 are automatically facilitated and collected using the CADSSS 104. In block 200, the pursuit team 26 performs an evaluation and analysis of a service project. For example, block 200 represents the pursuit team 26 using an engagement questionnaire to evaluate whether a managed desktop computer service would meet a potential customer's needs. The questionnaire asks the customer to list the countries in which their employees need a service (e.g., desktop management). The filled-out questionnaire is passed to the solution architects 42, as illustrated by block 204. In block 204, the solution architects 42 capture the customer's requirements and financial objectives, which are used to created a statement of work (SOW). The SOW (e.g., 116) specifies a deliverable configuration of service features, including a breakdown of the processes required to deliver the service and the types of applications and resources selected to enact the necessary processes. For example, the SOW can specify that a certain application be used to provide hardware asset management. The SOW is then passed to the implementation team 58, as illustrated by block 208. The implementation team 58 translates the SOW into a feasible delivery plan. For example, the delivery plan can specify the steps for setting up the selected hardware asset management application.

Block 212 illustrates integrating the design process, wherein the model layer 136 serves as the integration point in the procedure. Structure, semantics, and content (e.g., 124) of key domain-specific concepts used in the design processes can be integrated in block 212. Structure means that a layer is defined in a canonical model (e.g., the model layer 136 includes constructs to configure a managed desktop hardware assessment feature). Semantics refer to relationships between concepts and the operations related to them. For example, coverage and traceability relationships between customer requirements and selected hardware asset management applications can be captured. Content means that the model layer 136 is responsible for integrating various data sources. For example, the model layer 136 provides access to service metadata stored in various sources. Together, structure, semantics, and content facilitate designing parameterized standard components for lifecycle phases.

To support the flexibility desired to incorporate new domain-level constructs into the model layer 136 as it evolves, the core library 140 is provided to facilitate management of relationships between domain objects. These constructs are used to support a variety of correlation patterns between objects. For example, at each phase of design, a recurring pattern of a template defines the parameters that can be configured (e.g., a service blueprint) and configuration instances that capture the actual values of the parameters (e.g., a service feature definition). An instance is a generic interface for an instance of a configuration template. Each instance is associated with a set of configured parameters (parameters having set values). The model library 140 includes a set of constructs that support the concepts of feature templates and instances of feature templates. These constructs are used throughout the system to capture the relationship between the feature template, associated parameters and ranges, and configured feature instances.

The core model library 140 facilitates visualization and manipulation of relationships between configuration components. The generic interfaces (e.g., 140, 148, and 156) provide correlation of arbitrary information across configurations. For example, given a mapping between customer requirements and configurable features of the managed desktop service, a mapping between managed desktop features and setup delivery plan elements, and a pivot point (e.g., the features), the two mapping instances can be automatically merged to create a third instance of mapping. The third instance of mapping correlating to requirements and delivery plan elements. This facilitates root cause and impact analysis, as well as validation of coverage (e.g., ensuring that a configured setup delivery plan meets all of the customer's requirements).

Block 216 represents leveraging personal productivity tools in accordance with present embodiments. As set forth above, service providers are frequently subject to changing regional business logic. For example, cost models typically vary by region. Due to the size and complexity of modern businesses, it can be impractical to rely on globally consistent universal sources for business logic. For example, it is likely that a solution architect in Japan and a solution architect in Canada will use a different set of tools for hardware asset management because local tools will likely be requested. The price and availability of such tools can vary significantly. Accordingly, since the price of service delivery reflects the price of selected tools, embodiments of the present invention reflect regional updates.

FIG. 4 is a representation of the output from a matrix tool illustrating embodiments of the present invention. The matrix tool is generally referred to by reference number 250. In the illustrated embodiments, the matrix tool 250 is part of a software application. In FIG. 4, the matrix tool 250 illustrates a table for associating configured service instances to customer requirements. The matrix tool 250 is illustrative of a component created for performing aspects of integration (block 212). Specifically, the matrix tool 250 is a component for manipulating and visualizing mapping objects. As illustrated in FIG. 4, this tool can dynamically produce a clickable matrix 254 for display via an application (e.g., a Web browser) that a human can use to manipulate correlations between pairs of Correlated Objects (i.e., generic interfaces for component objects that can be correlated). In accordance with present embodiments, a Correlated Object dictates some general properties for use in displays (e.g., a popup name, display name, identifier) as well as some generic operations (e.g., save changes).

In FIG. 4, the user has requested to see correlations using a three-by-three matrix. The number of cells shown is configurable by text boxes 258. It could alternatively be configurable by a drop-down menu. As a user moves their cursor 262 across column and row headings as well as over individual cells, pop-up windows 266 appear with detailed information regarding correlated objects. For example, in FIG. 4 information regarding the configured service instance corresponding to the title for a particular row is displayed. In one embodiment, the user can click in the cells to turn correlations on and off, and click on a submit button 270 to make the changes. The matrix tool 250 then interacts with reusable control logic and the library 140 to update appropriate mapping objects.

The matrix tool 250 provides generic functions for manipulating mappings. For example, the matrix tool 250 can provide correlations between elements of two mappings or identify elements that participate in contradictory mappings. Given an instance of a mapping, the matrix tool 250 can automatically create a data grid that shows associations between Correlated Objects in an intuitive manner, and that a knowledgeable human can use to correct correlation between the two systems. Correlated Objects include generic interfaces for component objects that can be correlated. These interfaces can dictate some general properties for use in display names as well as generic operations. In one embodiment, an exclusive-or relationship can be defined between components, indicating that one service feature precludes another. This will allow the matrix tool 250 to determine when an early stage of configuration leads to conflicts in a later stage of configuration.

Figure 5:
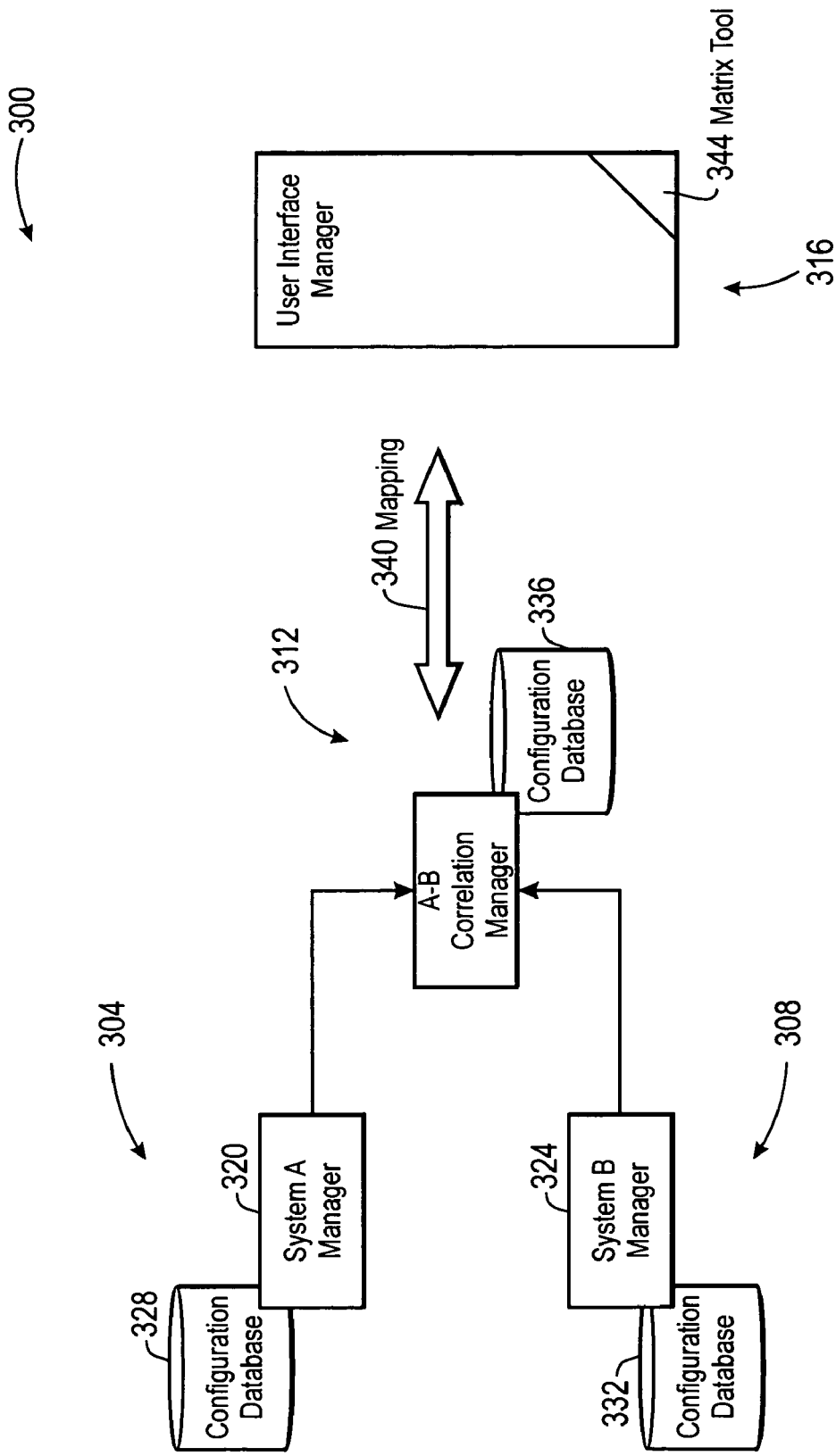
FIG. 5 is a block diagram of a system and its component systems illustrating one embodiment of the present invention.

FIG. 5 is a block diagram of a system and its component systems illustrating one embodiment of the present invention. The system is generally referred to by reference number 300. Specifically, the system 300 includes a system A indicated by reference number 304, a system B indicated by reference number 308, a correlation manager 312, and a user interface manager 316.

Given a sequence of systems to be configured (e.g., systems A and B), a configuration manager is provided for each system. For example, system A includes a manager 320 and system B includes a manager 324. Each manager (e.g., 320 and 324) creates appropriate Correlated Objects for its system configuration components. These configurations can be stored in each systems configuration database. For example, system A has a configuration database 328 and system B includes a configuration database 332. For each pair of systems to be correlated, a mapping manager (e.g., correlation manager 312) having a configuration database 336 is provided. For example, the correlation manager 312 maps correlations between configured instances of systems A and B. In particular, given an instance of a configuration, the correlation manager 312 generates an appropriate instance of mapping, as illustrated by arrow 340. That is to say, the core model library 140 can include an interface for a generic Correlation Manager, which specifies properties (e.g., database table containing the correlation data and the types of objects being correlated) and functions (e.g., retrieve existing correlations, save correlation updates to the database) that a mapping manager supports. Implementors of the Correlation Manage interface can be plugged directly into other core library constructs, control layer components, and view layer tools.

It should be noted that mapping 340 includes an interface that manages a correlation between two sets of correlated objects. Such an interface implements access methods. Exemplary access methods include: GetCorrelations( ) which returns a CorrelatedPairList consisting of mapping's correlations; GetColumnIDIndex( ) and GetRowIDIndex( ), which return indices mapping IDs to column and row indices; and Save( ), which persists the correlations represented by the mapping in the appropriate data sources. Mapping also includes an object that analyzes its correlations, for example, identifying elements that are non-participants in any mappings. Further, mappings themselves can be correlated (e.g., is Parent and is Child can be correlated as contradictory). It should further be noted that a CorrelatedPairList is a construct that represents a list of correlated pairs (e.g., an interface that represents the correlation of two Correlated Objects). For example, a Correlation Manager can use a CorrelatedPairList to manage the relationships between specific customer requirements and configured service instances.

The user interface manager 316 can take and manipulate the mapping 340 with a matrix tool 344 by, for example, facilitating visualization and resetting associations between configuration components. For example, the matrix tool 344 can dynamically generate interactive Web pages that a knowledgeable human can use. The matrix tool 344 includes matrix tool 250 in one embodiment. Given an instance of a mapping, the user interface manager 316 can automatically create a data grid (e.g., FIGS. 4 and 5) that illustrates associations between the Correlated Objects in an intuitive manner, and that a knowledgeable human can use to correct correlations between the two systems.

While the invention can be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for correlating configurations, comprising:
a networked system of computers with memory storing:
a model layer having a generic model library capable of adapting to underlying data sources, wherein the generic model library includes a model configured to capture specific instances of correlation between two objects of types that can be correlated and configured to provide forward and backward coordination between the two objects;
a control layer having generic control logic implemented in terms of the generic model library; and
a view layer having reusable views and common tools that operate upon generic interfaces and constructs defined by the generic model library, wherein the generic model library, generic control logic, and reusable views and commons tools are defined to support a general functionality.

2. The system of claim 1, further comprising domain-specific models derived from the generic model library.

3. The system of claim 2, wherein the generic model library includes a general common model of properties and functions to facilitate the management of mappings between systems.

4. The system of claim 2, wherein the generic model library includes a model configured to access and manipulate specific instances of correlations.

5. The system of claim 1, further comprising application control logic derived from the generic control logic.

6. The system of claim 5, wherein the generic control logic is configured to manage correlations between objects derived from the generic model library.

7. The system of claim 1, further comprising application screens derived from the reusable views and common tools.

8. The system of claim 7, wherein the reusable views and common tools are configured to operate upon objects derived from the generic model library and interact with application control logic derived from the generic control logic.

9. The system of claim 1, further comprising a user interface manager that correlates information between the generic model library, generic control logic, and reusable views and common tools to provide support for the general functionality.

10. The system of claim 1, further comprising a matrix tool adapted to manipulate correlations via a display.

11. A system for correlating configurations, comprising:
a networked system of computers with memory storing:
a model layer having a generic model library capable of adapting to underlying data sources, wherein the generic model library includes a model configured to capture specific instances of correlation between two objects of types that can be correlated and configured to provide forward and backward coordination between the two objects;
domain-specific models derived from the generic model library;
a control layer having generic control logic implemented in terms of the generic model library;
application control logic derived from the generic control logic;
a view layer having reusable views and common tools that operate upon generic interfaces and constructs defined by the generic model library, wherein the generic model library, generic control logic, and reusable views and commons tools are defined to support a general functionality;
application screens derived from the reusable views and common tools;
a user interface manager that correlates information between the generic model library, generic control logic, and reusable views and common tools to provide support for the general functionality; and
a matrix tool adapted to manipulate correlations via a display.

* * * * *

UNITED STATES PATENT AND TRADEMARK OFFICE
CERTIFICATE OF CORRECTION

PATENT NO. : 8,209,201 B1
APPLICATION NO. : 11/297520
DATED : June 26, 2012
INVENTOR(S) : Kei Yuasa et al.

It is certified that error appears in the above-identified patent and that said Letters Patent is hereby corrected as shown below:

On the Title page, in Item (75), Inventors, in column 1, line 1, delete "Kel" and insert -- Kei --, therefor.

Signed and Sealed this
Eighteenth Day of December, 2012

David J. Kappos
*Director of the United States Patent and Trademark Office*